(12) United States Patent
Higuchi

(10) Patent No.: US 7,345,613 B2
(45) Date of Patent: Mar. 18, 2008

(54) IMAGE PROCESSING CIRCUIT, IMAGING CIRCUIT, AND ELECTRONIC DEVICE

(75) Inventor: Tsuyoshi Higuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/546,287

(22) Filed: Oct. 12, 2006

(65) Prior Publication Data

US 2008/0001802 A1 Jan. 3, 2008

(30) Foreign Application Priority Data

Jun. 30, 2006 (JP) ............... 2006-180563

(51) Int. Cl.
*H03M 1/12* (2006.01)
(52) U.S. Cl. .............. 341/155; 341/164; 341/169; 348/222.1; 348/241; 348/308
(58) Field of Classification Search ........ 341/169
See application file for complete search history.

(56) References Cited

U.S. PATENT DOCUMENTS 5,946,033 A * 8/1999 Mooney et al. .......... 348/312
6,774,941 B1 * 8/2004 Boisvert et al. ............ 348/241
7,075,474 B2 * 7/2006 Yamagata et al. .......... 348/241
2006/0114342 A1 * 6/2006 Egawa ..................... 348/241
2006/0170795 A1 * 8/2006 Higuchi et al. ............. 348/241
2007/0080842 A1 * 4/2007 Kawahito ................. 341/155

FOREIGN PATENT DOCUMENTS

| JP | 2001-203936 A | 7/2001 |
| JP | 2005-136540 A | 5/2005 |

* cited by examiner

*Primary Examiner*—Khai M. Nguyen
(74) *Attorney, Agent, or Firm*—Arent Fox, LLP.

(57) ABSTRACT

An image processing circuit for reducing noise. The image processing circuit includes a CDS circuit for taking a potential difference between a pixel signal at a reset of an image pickup device and a pixel signal after exposure, and an AD conversion circuit. The AD conversion circuit includes an increment counter and AD conversion clock provided for the AD conversion of the potential difference of the image pickup device between at a reset and after exposure, and an averaging ADC control circuit for averaging a plurality of digital code values obtained through the AD conversion repeated a plurality of times.

10 Claims, 17 Drawing Sheets

| COUNTER VALUE (QUANTIZED VALUE) || DATA NAME | EXPRESSION (ADDITION) | ENCODED VALUE |
| --- | --- | --- | --- | --- |
| FIRST AD CONVERSION | SECOND AD CONVERSION | | | |
| 10 | 10 | ⑳ | 10+10= | 20 |
| | | ⑲ | 10+10= | 20 |
| 9 | 9 | ⑱ | 9+9= | 18 |
| | | ⑰ | 9+9= | 18 |
| 8 | 8 | ⑯ | 8+8= | 16 |
| | | ... | ... | ... |
| ... | ... | ... | ... | ... |
| | | ... | ... | ... |
| 3 | 3 | ⑥ | 3+3= | 6 |
| | | ⑤ | 3+3= | 6 |
| 2 | 2 | ④ | 2+2= | 4 |
| | | ③ | 2+2= | 4 |
| 1 | 1 | ② | 1+1= | 2 |
| | | ① | 1+1= | 2 |

FIG. 5

| COUNTER VALUE (QUANTIZED VALUE) | | DATA NAME | EXPRESSION (ADDITION) | ENCODED VALUE |
|---|---|---|---|---|
| FIRST AD CONVERSION | SECOND AD CONVERSION | | | |
| 20 | 20 | ⑳ | (20+20)/2 | 20 |
| 19 | 19 | ⑲ | (19+19)/2 | 19 |
| 18 | 18 | ⑱ | (18+18)/2 | 18 |
| 17 | 17 | ⑰ | (17+17)/2 | 17 |
| 16 | 16 | ⑯ | (16+16)/2 | 16 |
| ... | ... | ... | ... | ... |
| ... | ... | ... | ... | ... |
| ... | ... | ... | ... | ... |
| 6 | 6 | ⑥ | (6+6)/2 | 6 |
| 5 | 5 | ⑤ | (5+5)/2 | 5 |
| 4 | 4 | ④ | (4+4)/2 | 4 |
| 3 | 3 | ③ | (3+3)/2 | 3 |
| 2 | 2 | ② | (2+2)/2 | 2 |
| 1 | 1 | ① | (1+1)/2 | 1 |

FIG. 8

| COUNTER VALUE (QUANTIZED VALUE) || DATA NAME | EXPRESSION (ADDITION) | ENCODED VALUE |
| --- | --- | --- | --- | --- |
| FIRST AD CONVERSION | SECOND AD CONVERSION | | | |
| 10 | 10 | ⑳ | 10+10= | 20 |
|  | 9 | ⑲ | 10+9= | 19 |
| 9 |  | ⑱ | 9+9= | 18 |
|  | 8 | ⑰ | 9+8= | 17 |
| 8 |  | ⑯ | 8+8= | 18 |
|  | ... | ... | ... | ... |
| ... |  | ... | ... | ... |
|  | 3 | ... | ... | ... |
| 3 |  | ⑥ | 3+3= | 6 |
|  | 2 | ⑤ | 3+2= | 5 |
| 2 |  | ④ | 2+2= | 4 |
|  | 1 | ③ | 2+1= | 3 |
| 1 |  | ② | 1+1= | 2 |
|  | 0 | ① | 1+0= | 1 |

FIG. 10

IMAGE PROCESSING CIRCUIT, IMAGING CIRCUIT, AND ELECTRONIC DEVICE

CROSS-REFERENCE TO RELATED APPLICATIONS

This application is based upon and claims the benefits of priority from the prior Japanese Patent Application No. 2006-180563, filed on Jun. 30, 2006, the entire contents of which are incorporated herein by reference.

BACKGROUND OF THE INVENTION

1. Field of the Invention

The present invention relates to image processing circuits, imaging circuits, and electronic devices, and particularly to an image processing circuit, an imaging circuit, and an electronic device for use in processing a captured image.

2. Description of the Related Art

In recent years, digital still cameras and digital video cameras have become widespread, and portable terminals have incorporated camera functions, so that imaging circuits equipped with a solid-state image pickup device have grown in demand.

FIG. 16 shows a part of an imaging circuit using a solid-state image pickup device.

The imaging circuit includes a solid-state image pickup device 80 and an image processing circuit 90.

The image processing circuit 90 includes a switch sw91 for connecting or disconnecting the solid-state image pickup device 80, a differential amplifier (comparator) 91, a ramp signal supply source 91a for supplying a ramp signal, a capacitor C91 connected to a non-inverting input terminal of the differential amplifier 91, a capacitor C92 connected to an inverting input terminal, a switch sw92 for connecting or disconnecting the output terminal and the inverting input terminal of the differential amplifier 91, an increment counter 92 for counting up in accordance with the output value of the differential amplifier 91, an AD conversion clock 93 for supplying an operation clock signal to the increment counter 92, and an ADC control circuit 94 for controlling AD conversion by supplying a reset signal to the increment counter 92 or the like.

The conventional operation of the imaging circuit will be described next.

FIG. 17 is a timing chart illustrating the conventional operation of the imaging circuit.

In FIG. 17, a connection node between the non-inverting input terminal of the differential amplifier 91 and the capacitor C91 is denoted as n91; a connection node between the inverting input terminal and the capacitor C92 is denoted as n92; and a connection node between the output terminal of the differential amplifier 91 and the increment counter 92 is denoted as n93.

First, initial reading is carried out. To be more specific, noise reading (N Read) is performed first, and the capacitor C92, connected to the inverting input terminal, holds the voltage equivalent to the noise voltage (T90-to-T91 time segment).

Then, signal-plus-noise reading (S+N Read) is performed, and the signal-plus-noise voltage is input to the non-inverting input terminal of the differential amplifier 91 (T91-to-T92 time segment). These operations give the noise voltage to the inverting input terminal and the signal-plus-noise voltage to the non-inverting input terminal, bringing the potential difference between the two input terminals to the signal voltage.

Next, the switch sw91 is turned off, and the signal-plus-noise voltage is held at the non-inverting input terminal. This operation ends the initial reading.

The AD conversion clock 93 is activated (in a shaded portion in the figure), and the potential of the non-inverting input terminal coupled to a capacitor is driven by a ramp signal, thereby ramping up the signal-plus-noise voltage in the direction of the noise voltage. The counter counts up until the output of the differential amplifier is inverted and stops when the output is inverted, thereby performing AD conversion (T92-to-T93 time segment).

In the conventional operation, an encoded value (digital output value) output from the image processing circuit 90 equals the counter value counted by the increment counter 92.

It is increasingly required that the imaging circuit generate an imaging signal with reduced noise. One known method to reduce the effect of noise is an imaging circuit having a function to cancel out noise generated in a pixel portion of the image pickup device (refer to Japanese Unexamined Patent Application Publication No. 2005-136540).

In the conventional operation, however, white noise caused by thermal noise or the like causes images with a low signal-to-noise ratio, such as a dark image, to become coarse, like snow.

White noise caused by thermal noise or the like is added to a voltage value encoded in AD conversion. If this white noise is greater than the potential difference per bit (LSB) in AD conversion, the noise component remains in the encoded value. Noise varies with time, causing each pixel having the same brightness, not varying with time, to flicker frame to frame, causing a dark image to become coarse like snow. Recent demands for high resolution and high picture quality create a trend toward a reduced signal per pixel and an increased resolution, worsening the S-N ratio. This problem has become apparent especially in a dark image, having a low S-N ratio.

SUMMARY OF THE INVENTION

In view of the foregoing, it is an object of the present invention to provide an image processing circuit, an imaging circuit, and an electronic device that can reduce noise.

To accomplish the above object, according to the present invention, there is provided an image processing circuit used in an imaging circuit for capturing an image by using a solid-state image pickup device for reading a pixel signal. This image processing circuit includes a CDS circuit for taking a potential difference between the pixel signal at a reset of the solid-state image pickup device and the pixel signal after exposure, and an AD conversion circuit including a circuit for performing AD conversion of the potential difference and a processing unit for performing averaging of a plurality of digital code values obtained through the AD conversion repeated a plurality of times.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a view (table) showing the relationship between the counter value and the encoded value of the signal processing of the first embodiment.

FIG. 8 is a view (table) showing the relationship between the counter value and the encoded value of the signal processing of the third embodiment.

FIG. 10 is a view (table) showing the relationship between the counter value and the encoded value of the signal processing of the fourth embodiment.

DESCRIPTION OF THE PREFERRED EMBODIMENTS

Embodiments of the present invention will be described below in detail with reference to the drawings.

Figure 1:
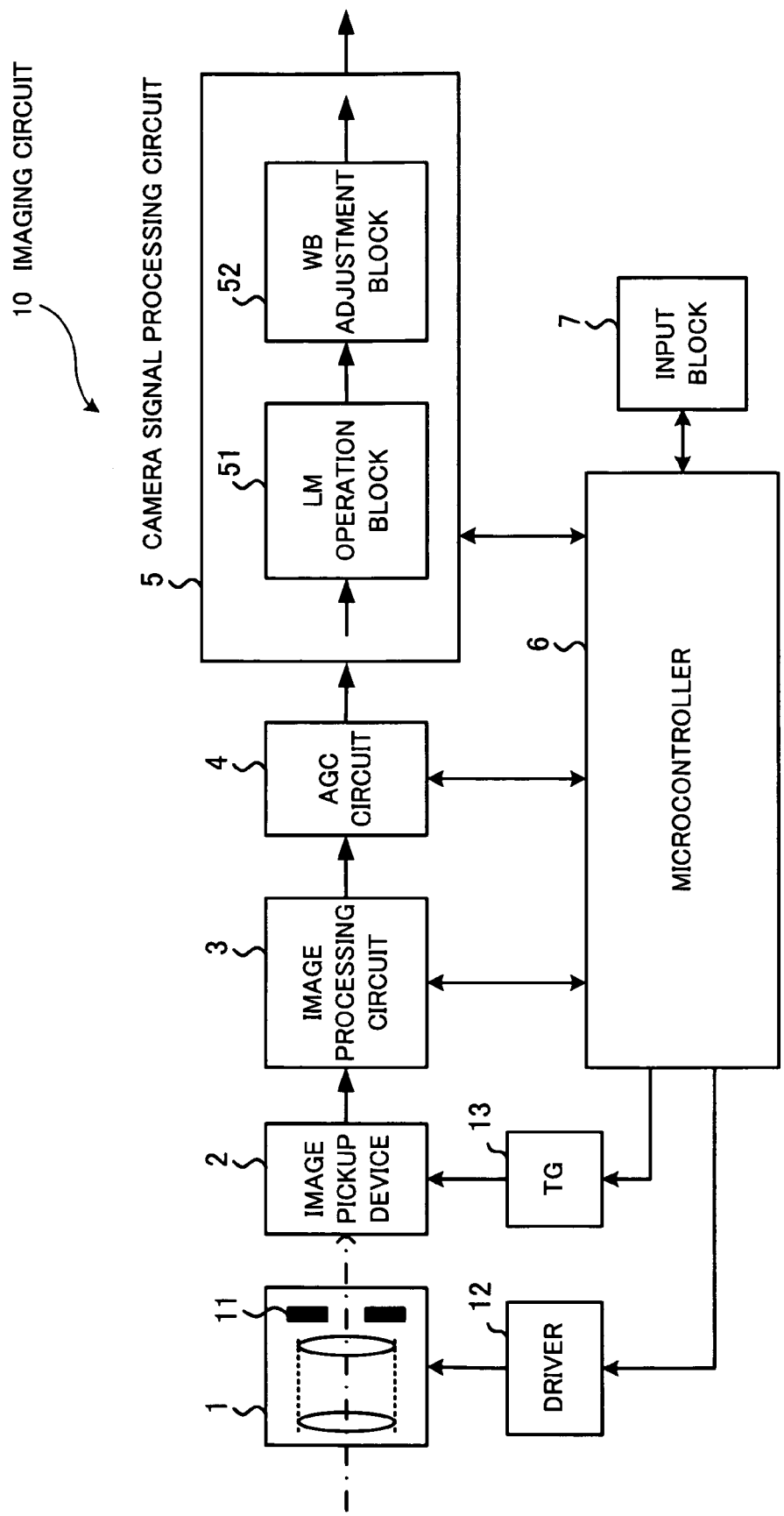
FIG. 1 is a block diagram showing an essential structure of an imaging circuit according to an embodiment of the present invention.

FIG. 1 is a block diagram showing an essential structure of an imaging circuit according to an embodiment of the present invention.

The imaging circuit 10 shown in FIG. 1 includes an optical block 1, an image pickup device 2, an image processing circuit 3, an automatic gain control (AGC) circuit 4, a camera signal processing circuit 5, a microcontroller 6, and an input block 7. The imaging circuit 10 includes also a driver 12 for driving the mechanism such as a diaphragm 11 in the optical block 1, a timing generator (TG) 13 for driving the image pickup device 2, and the like.

The optical block 1 includes a lens for collecting light from an object to be imaged onto the image pickup device 2, a drive mechanism for moving the lens for focusing and zooming, a mechanical shutter, and the diaphragm 11, and the like. The driver 12 drives the internal mechanism of the optical block 1 in accordance with a control signal from the microcontroller 6.

The image pickup device 2 is a solid-state image pickup device of a charge-coupled device (CCD) type, a complementary metal oxide semiconductor (CMOS) type, or the like, and is driven to convert incident light from the object to an electric signal in accordance with a timing signal output from the TG 13. The TG 13 outputs the timing signal as controlled by the microcontroller 6.

The image processing circuit 3 includes a correlated double sampling (CDS) circuit for performing sample-hold processing to maintain a good S-N ratio by applying CDS processing to an image signal output from the image pickup device 2 and an AD conversion circuit for performing AD conversion and outputting a digital image signal, the circuits being controlled by the microcontroller 6.

The AGC circuit 4 performs gain-up processing for the digital image signal output from the image processing circuit 3, under the control of the microcontroller 6. The AGC processing may be performed for an analog image signal before AD conversion by the image processing circuit 3.

The camera signal processing circuit 5 performs auto-focus (AF) processing, auto-exposure (AE) processing, white balance adjustment, and other camera signal processing on an image signal output from the AGC circuit 4 or performs a part of the processing. In the present embodiment, the camera signal processing circuit 5 includes a linear matrix (LM) operation block 51 for performing a matrix operation on each color component of an input image signal and a white balance (WB) adjustment block 52 for adjusting the gain of each color component.

The microcontroller 6 includes, for instance, a central processing unit (CPU), a read-only memory (ROM), a random access memory (RAM), and the like, and executes a program stored in the ROM or the like to comprehensively control the different blocks of the imaging circuit 10 and to execute operations needed to control them. The input block 7 includes operation keys, a dial, a lever, and the like for accepting the operation input of the user, and outputs a control signal depending on the operation input to the microcontroller 6.

In the imaging circuit 10, signals photoelectric-converted by the image pickup device 2 from received light are successively supplied to the image processing circuit 3, where they are converted to digital signals and supplied to the AGC circuit 4 for gain adjustment. The camera signal processing circuit 5 performs picture quality correction processing on each digital image signal supplied by the AGC circuit 4, converts the signal to a luminance signal and a color-difference signal, and outputs them.

The image data output from the camera signal processing circuit 5 is supplied to a graphic interface circuit, which is not shown, and converted to a display image signal, by which a camera through image is displayed on a monitor, which is not shown. If the input block 7 gives the microcontroller 6 an instruction to record the image in accordance with an operation input by the user, the image data is supplied from the camera signal processing circuit 5 to an encoder-decoder (CODEC), which is not shown, predetermined compression encoding is performed, and the encoded data is recorded on a recording medium, which is not shown. When a still image is recorded, the camera signal processing circuit 5 supplies the image data of one frame to the CODEC. When moving images are recorded, the encoded image data is successively supplied to the CODEC.

Figure 2:
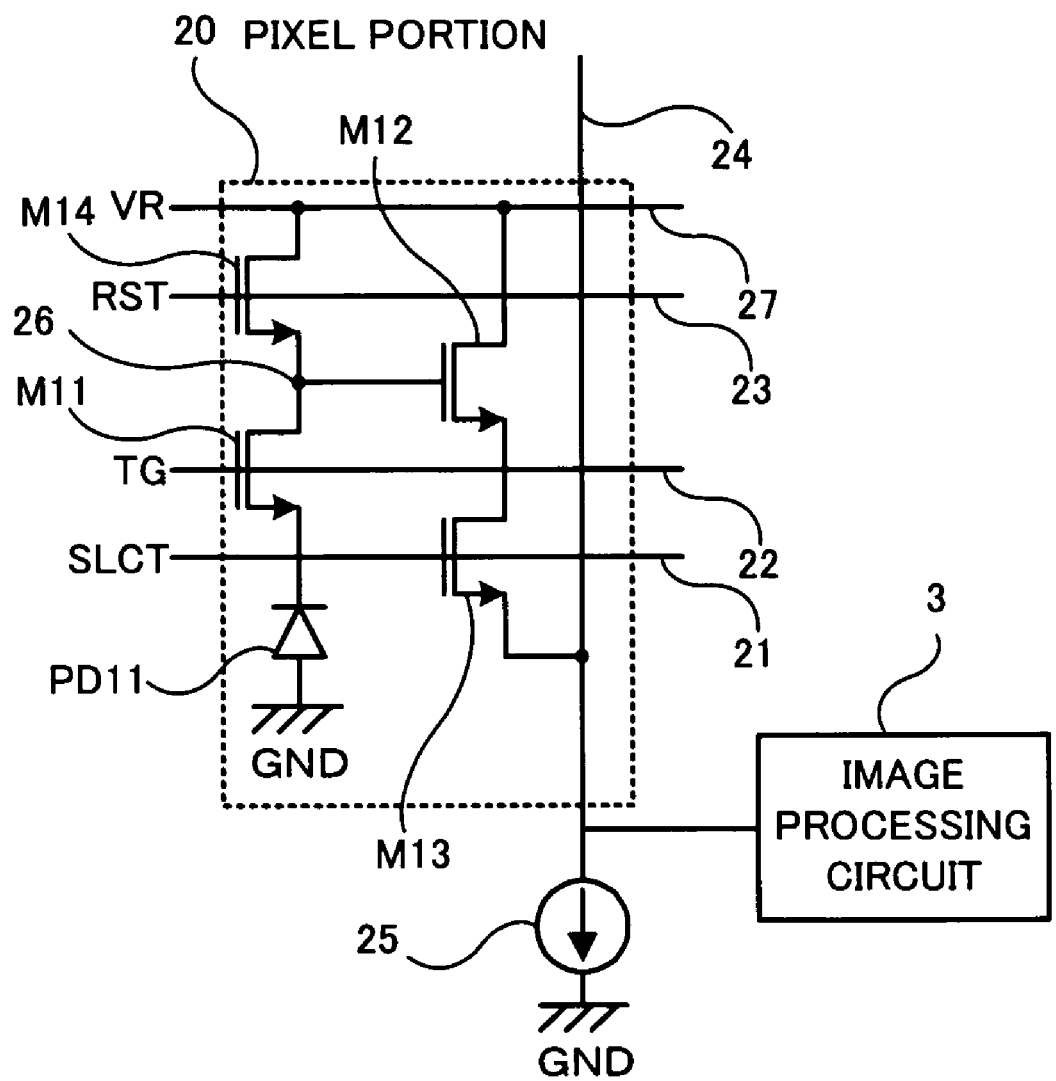
FIG. 2 is a view showing a part of an image pickup device.

FIG. 2 is a view showing a part of the image pickup device 2.

As shown in FIG. 2, a pixel portion 20, which is a part of the image pickup device 2, includes a photodiode (photoelectric transducer) PD11, a transfer transistor M11, an amplifying transistor M12, a selection transistor M13, and a reset transistor M14. These transistors are n-channel MOSFETs.

The gates of the selection transistor M13, the transfer transistor M11, and the reset transistor M14 are connected to a row selection signal line (SLCT) 21, a transfer signal line (TG signal supply line) 22, and a reset signal line (RST) 23, respectively. These signal lines are laid horizontally and drive the pixels in the same row simultaneously. This enables a rolling shutter of line progressive operation type and a global shutter, which works on all pixels simultaneously, to be controlled. The source of the selection transistor M13 is connected to a vertical signal line 24, and the other end of the vertical signal line 24 is grounded through a constant-current power supply 25. The vertical signal line 24 is also connected to the image processing circuit 3.

The photodiode PD11 accumulates an electric charge generated by photoelectric conversion, having a positive terminal grounded and a negative terminal connected to the source of the transfer transistor M11. When the transfer transistor M11 is turned on, the electric charge of the photodiode PD11 is transferred to FD26, where the electric charge is accumulated.

The amplifying transistor M12 has a drain connected to a source voltage line (VR) 27 and a gate connected to the FD26. The amplifying transistor M12 converts a variance in potential at the FD26 into an electric signal. The selection transistor M13 is provided to select a row of pixels to be read, having a drain connected to the source of the amplifying transistor M12 and the source, connected to the vertical signal line 24. When the selection transistor M13 is turned on, the amplifying transistor M12 and the constant-current power supply 25 form a source follower and outputs a voltage determined by the voltage at the FD26 to the vertical signal line 24.

The reset transistor M14 has a drain connected to the source voltage line 27 and a source connected to the FD26. The reset transistor M14 resets the potential at the FD26 to the supply voltage.

The operation of the pixel portion 20 of the present embodiment will be described next.

This circuit can perform two types of electronic shutter operations: rolling shutter and global shutter.

In the rolling shutter operation, at each pixel portion 20 in a row, pulse signals are sent to the reset signal line 23 and the transfer signal line 22 to turn on the reset transistor M14 and the transfer transistor M11 to reset the FD26 and the photodiode PD11. When these transistors are turned off, the exposure period of the photodiode PD11 starts.

Immediately before the exposure period ends, the reset signal line 23 of the row is brought high to turn on the reset transistor M14, setting the FD26 to the supply voltage VR. In this state, the row selection signal line 21 of the row is brought high to turn on the selection transistor M13 to output a voltage corresponding to the reset voltage of the FD26 to the vertical signal line 24. Next, the reset signal line 23 is brought low to turn off the reset transistor M14, and then the transfer signal line 22 is brought high to turn on the transfer transistor M11. This ends the exposure period. The voltage proportional to the charge accumulated in the photodiode PD11 is transferred to the FD26, and a voltage corresponding to the voltage at the FD26 is output to the vertical signal line 24.

The difference between the voltage corresponding to the reset voltage and that of the voltage proportional to the accumulated charge becomes a signal voltage, and the signal voltage is extracted by the CDS processing of the CDS circuit.

After the selection transistor M13 and the transfer transistor M11 are turned off, the reset transistor M14 and the transfer transistor M11 are turned on and off. Then, the next exposure period starts. The above-described operations are performed one row after another with a delay in synchronization with a horizontal synchronizing signal, starting from the first row, and the pixel signals of the rows are output successively. The exposure period of each row is delayed from that of the previous row.

In the global shutter operation, the reset transistor M14 and the transfer transistor M11 are turned on to reset the FD26 and the photodiode PD11 for all rows at the same time. Accordingly, the exposure periods of all rows start simultaneously.

If a mechanical shutter is used, when the exposure period ends, charges accumulated in the photodiodes PD11 of each row are successively transferred to the FD26, and the signal voltages of each row are output to the vertical signal lines 24, as in the rolling shutter operation.

Figure 3:
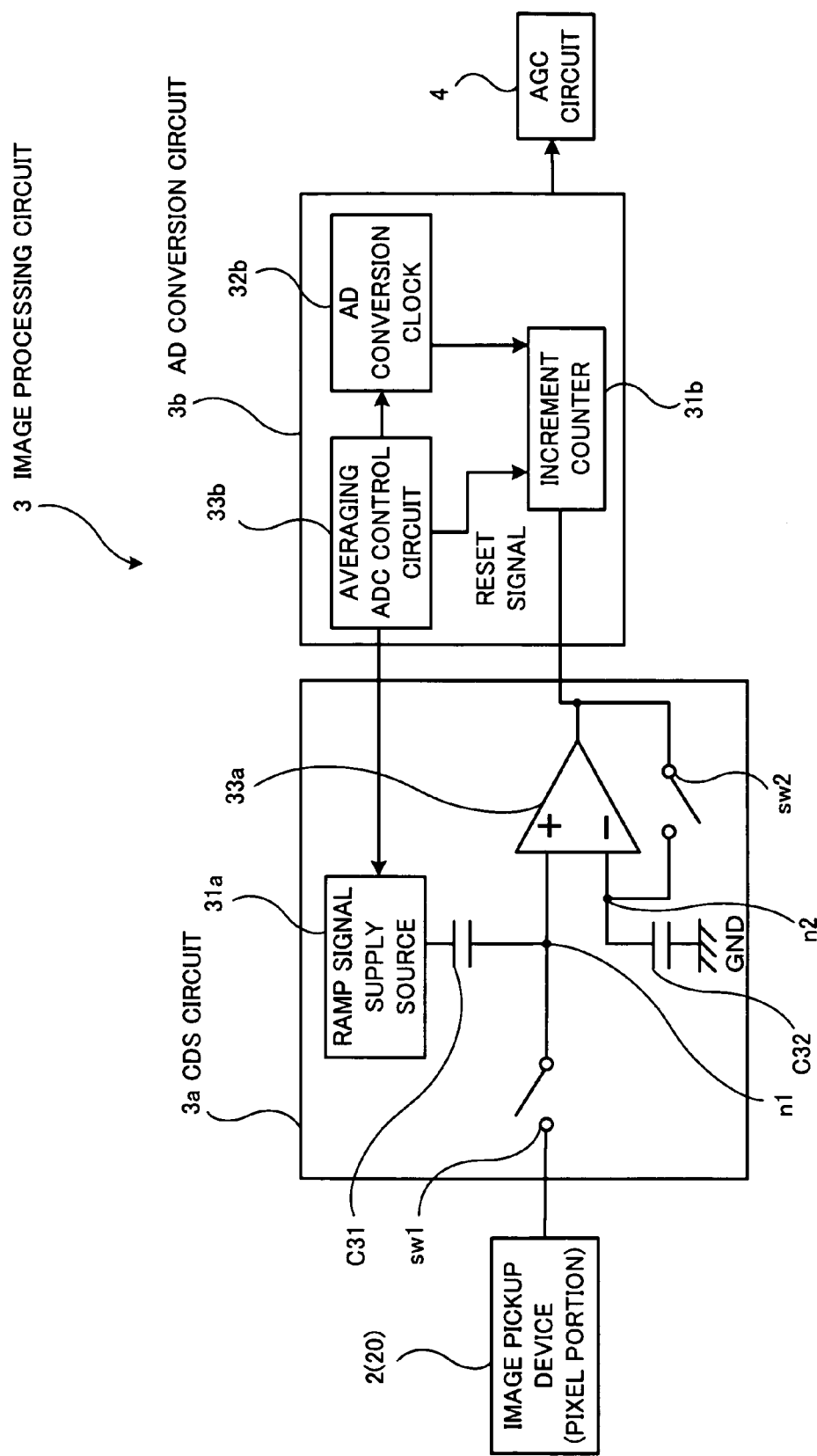
FIG. 3 is a view showing an image processing circuit.

FIG. 3 is a view showing the image processing circuit 3. The image processing circuit 3 includes a CDS circuit 3a and an AD conversion circuit 3b, as described earlier.

FIG. 3 shows the configuration of a CDS circuit for one column of the pixel portions 20.

The CDS circuit 3a includes a sample-hold switch sw1 for controlling the input of an image signal output from the pixel portion 20. The output of the sample-hold switch sw1 is connected to a capacitor (sample-hold capacitor) C31 for holding the image signal. The other side of the capacitor C31 is connected to a ramp signal supply source 31a for supplying a ramp signal for changing the potential of the image signal held in the capacitor C31.

A node n1 between the sample-hold switch sw1 and the capacitor C31 is connected to a non-inverting input terminal of a differential amplifier 33a.

A capacitor C32 is provided between an inverting input terminal of the differential amplifier 33a and the ground. A clamp switch sw2 is disposed between the output terminal of the differential amplifier 33a and a node n2, which is disposed between the inverting input terminal and the capacitor C32. The output terminal of the differential amplifier 33a is connected to the AD conversion circuit 3b.

The AD conversion circuit 3b includes an increment counter 31b, an AD conversion clock 32b for supplying a clock signal to the increment counter 31b, and an averaging ADC control circuit 33b for controlling the whole of the AD conversion circuit 3b.

The increment counter 31b counts up when the clock signal is supplied from the AD conversion clock 32b and when a positive signal is output from the output terminal of the differential amplifier 33a.

The averaging ADC control circuit 33b performs averaging, which will be described later, in AD conversion and calculates an encoded value.

The averaging ADC control circuit 33b also sends the ramp signal supply source 31a timings to start, stop, and reset the ramp signal, sends a counter reset signal to the increment counter 31b, and sends the AD conversion clock 32b timings to start, stop, and reset the clock.

Signal processing according to a first embodiment will be described next.

Figure 4:
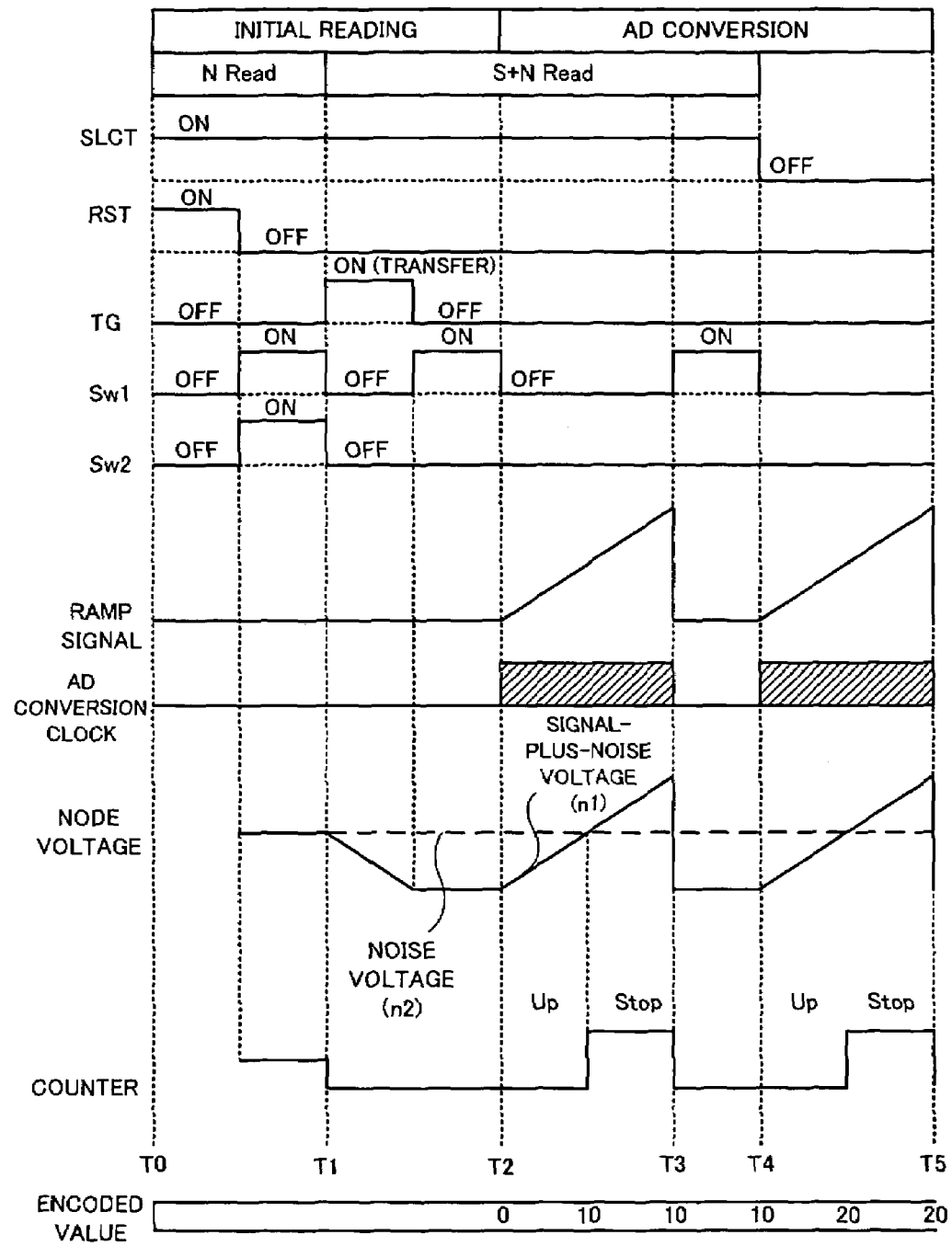
FIG. 4 is a timing chart showing signal processing of a first embodiment.

FIG. 4 is a timing chart showing the signal processing of the first embodiment.

First, initial reading is performed. Noise reading (N Read) is first performed in the initial reading (T0-to-T1 time segment). To be more specific, a pixel is selected by bringing the row selection signal line (SLCT) 21 high, and the reset signal line 23 is brought low. At the same time, the sample-hold switch sw1 is turned on, and the clamp switch sw2 is turned on. Turning on the sample-hold switch sw1 causes the noise voltage of the pixel to be input to the non-inverting input terminal of the differential amplifier 33a. Turning on the clamp switch sw2 causes a voltage corresponding to the noise voltage to be held (stored) in the capacitor C32, connected to the inverting input terminal. The offset potential between the non-inverting input terminal and the inverting input terminal of the differential amplifier 33a is included in the voltages at the input terminals and held in the capacitor C32, connected to the inverting input terminal, and the offset potential is cancelled in subsequent operations.

Signal-plus-noise reading (S+N Read) is performed next (T1-to-T2 time segment). The clamp switch sw2 is turned off to release Auto-Zero, and the noise voltage at the inverting input terminal is held. At the same time, the sample-hold switch sw1 is turned off to produce no effect on the pixel transfer operation from the AD conversion circuit 3b. The transfer signal line 22 of the pixel is brought high to transfer the read potential, then the sample-hold switch sw1 is turned on to input the signal-plus-noise voltage to the non-inverting input terminal. These operations give the noise voltage to the inverting input terminal and the signal-plus-noise voltage to the non-inverting input terminal, the potential difference between the two inputs being the signal voltage. The operations up to this point is performed as the initial reading.

Next, AD conversion is performed (T2-to-T5 time segment). The sample-hold switch sw1 is turned off to hold the signal-plus-noise voltage at the non-inverting input terminal. The AD conversion clock is activated (in shaded portions in FIG. 4) to drive the potential at the non-inverting input terminal connected to a capacitor by a ramp signal and to ramp up the signal-plus-noise voltage in the direction of noise voltage. The counter counts up until the output of the differential amplifier is inverted and stops when the inversion occurs, thereby AD conversion is performed.

In the present embodiment, the resolution of a single AD conversion is halved in the T2-to-T5 time segment (unit time), and the AD conversion is carried out twice (a plurality of times). Accordingly, noise is read in the initial reading, and the result is held in the capacitor C32. Next, a first AD conversion is performed as described earlier (T2-to-T3 time segment). Then, the sample-hold switch sw1 is turned on again to perform signal-plus-noise reading again (T3-to-T4 time segment). A second AD conversion is performed next (T4-to-T5 time segment). After the second signal-plus-noise reading is performed, the row selection signal line 21 is brought low.

FIG. 5 is a view (table) showing the relationship between the counter value and the encoded value of the signal processing of the first embodiment.

FIG. 5 has columns of counter value, data name, expression (addition), and encoded value. The items in a horizontal row are related to one another.

The counter value column is divided into two columns of first AD conversion and second AD conversion.

Count values (quantized values) obtained in the first AD conversion and the second AD conversion are recorded in the corresponding columns.

In the data name column, a name identifying the encoded value is entered.

In the expression column, a formula for obtaining the encoded value from the count values is specified.

In the encoded value column, an obtained encoded value is recorded.

If two AD conversions are carried out in the unit time, the LSB is doubled because the resolution of AD conversion is half of that when a single AD conversion is performed in the unit time. As a result, the encoded value changes every two conversions.

As described above, in the present embodiment, AD conversion is carried out a plurality of times in the unit time when the pixel signal of one row is read once. Between the first and second AD conversions, the capacitor C32 is not discharged nor re-charged, and the sum of the obtained count values is taken. The count value per bit obtained in the first AD conversion and the count value per bit obtained in the second AD conversion are added (and averaged) to obtain each encoded value.

It is generally known that a noise component is reduced by averaging data that includes different noise. In this embodiment, noise is reduced by averaging the counter values of different time series, without increasing the processing time greatly (just increasing the time for performing signal-plus-noise reading again), so that a change in noise component over time can be reduced. Because white noise of a dark image is reduced especially, the image is prevented from becoming coarse, or the coarse level of the image is suppressed. The quality of the image can be improved.

Signal-plus-noise reading is performed again after the first AD conversion ends, so that the signal-plus-noise read value does not deteriorate. Accordingly, a correct encoded value can be obtained.

Signal processing according to a second embodiment will be described next.

The signal processing of the second embodiment will be described next, with differences from the signal processing (of the signal processing circuit) of the first embodiment being stressed, and a description of common items is omitted.

Figure 6:
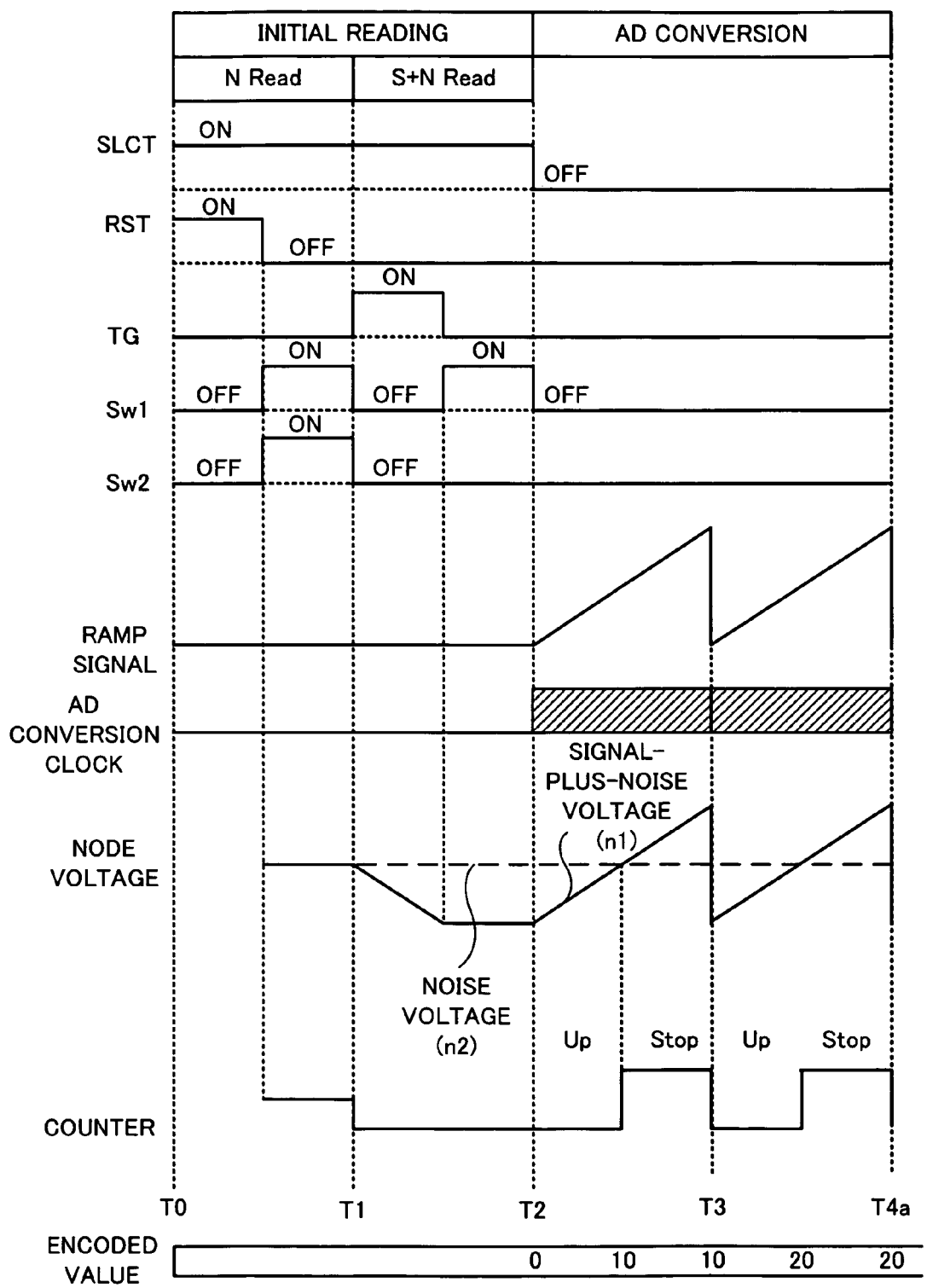
FIG. 6 is a timing chart showing signal processing of a second embodiment.

FIG. 6 is a timing chart showing the signal processing of the second embodiment.

The signal processing of the second embodiment differs from the signal processing of the first embodiment in that the sample-hold switch sw1 is not turned on or off before the second AD conversion (T3-to-T4 time segment), that is, signal-plus-noise reading is not performed again.

More specifically, the voltage held in the capacitor C31 in the first processing is used as the signal-plus-noise voltage of the second AD conversion. The value held in the capacitor C32 and used in the first processing is used as the noise voltage.

Noise is reduced in the signal processing of the second embodiment, and the image is prevented from becoming coarse, or the coarse level of the image is suppressed in comparison with the conventional processing. The image quality can be improved.

Because the signal-plus-noise voltage does not need to be read again, the processing time of AD conversion can be reduced.

Signal processing of a third embodiment will be described next.

The signal processing of the third embodiment will be described next, with differences from the signal processing of the first embodiment and the signal processing of the second embodiment being stressed, and a description of common items is omitted.

Figure 7:
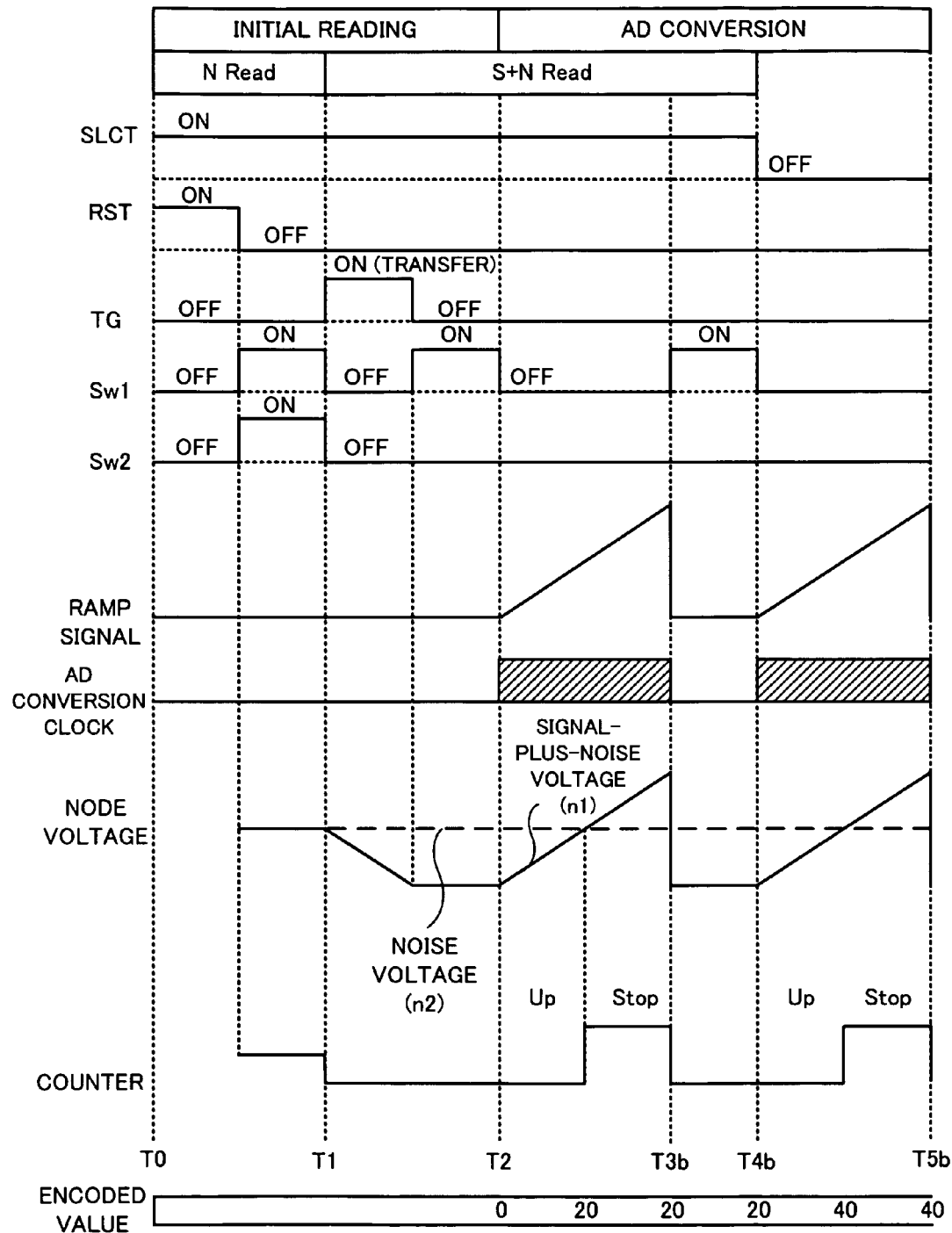
FIG. 7 is a timing chart showing signal processing of a third embodiment.

FIG. 7 is a timing chart showing the signal processing of the third embodiment.

In the signal processing of the third embodiment, the time period per AD conversion is twice that in the first embodiment or the second embodiment, and two AD conversions are carried out. The time period required to carry out one AD conversion in the third embodiment (T2-to-T3b time segment and T4b-to-T5b time segment) corresponds to the T2-to-T4a time segment of the second embodiment.

FIG. 8 is a view (table) showing the relationship between the counter value and the encoded value of the signal processing of the third embodiment.

In comparison with the signal processing of the first embodiment and the second embodiment, the signal processing of the third embodiment has a double resolution per AD conversion (the same resolution as the conventional signal processing), so that an encoded value can be obtained by averaging the resultant counter values.

The signal processing of the third embodiment produces the same advantages as the signal processing of the first embodiment and the second embodiment.

The signal processing of the third embodiment has substantially the same resolution of AD conversion as the conventional processing, so that a change in noise component over time can be reduced, and high-precision conversion can be carried out, producing a high-precision image.

Next, signal processing of a fourth embodiment will be described.

The signal processing of the fourth embodiment will be described next, with differences from the signal processing of the first embodiment being stressed, and a description of common items is omitted.

One characteristic of the signal processing of the fourth embodiment is that the second AD conversion is carried out with the initial potential (offset potential) of the ramp signal shifted by an amount corresponding to LSB/2.

Figure 9:
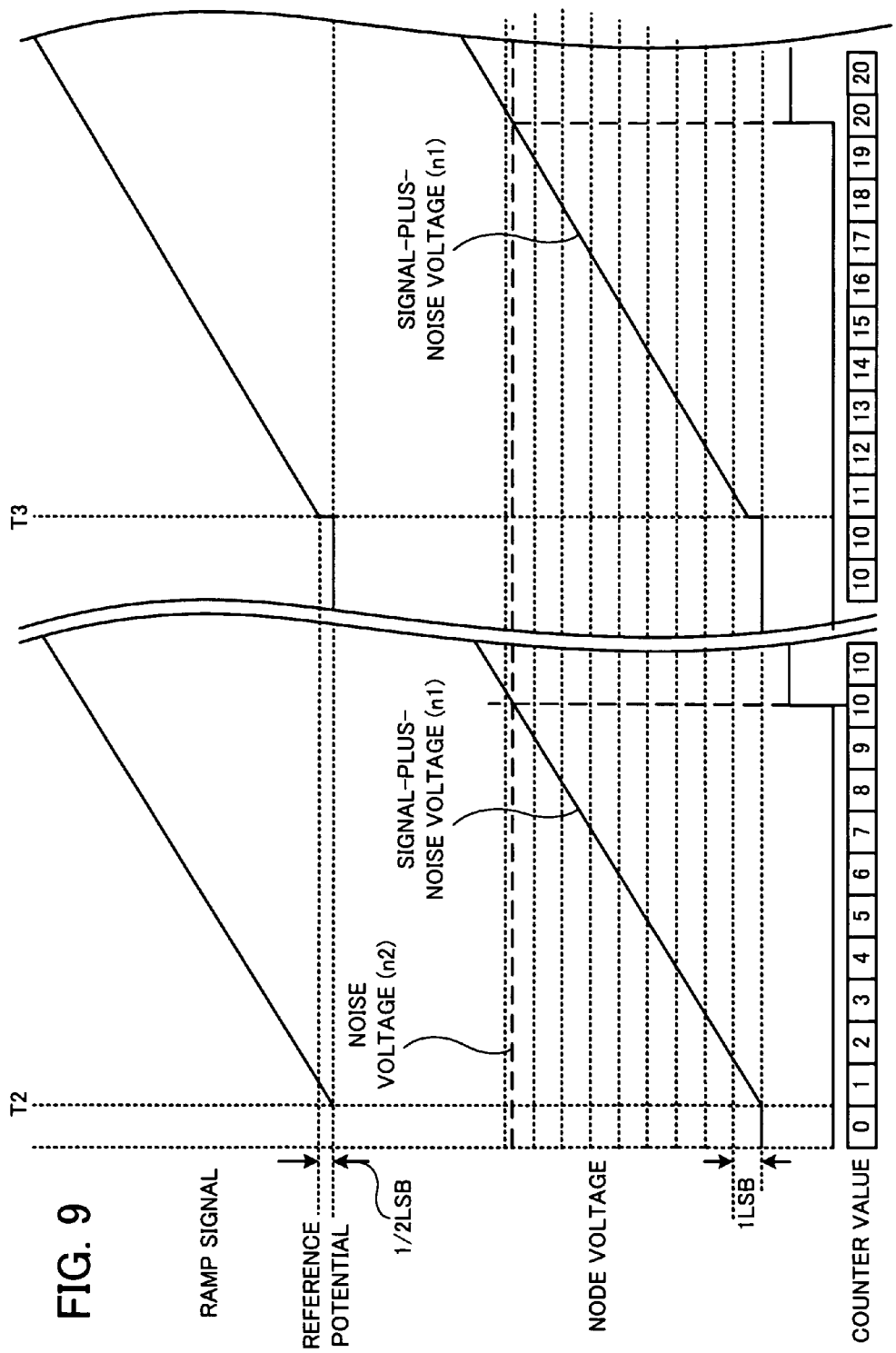
FIG. 9 is an enlarged view of an essential part of a timing chart showing signal processing of a fourth embodiment.

FIG. 9 is an enlarged view of an essential part of a timing chart showing the signal processing of the fourth embodiment.

As shown in FIG. 9, the second AD conversion starts with the initial potential of the ramp signal being shifted by an amount corresponding to LSB/2 of the AD conversion circuit 3b. The information of the initial potential of the second AD conversion is stored in the microcontroller 6 beforehand.

FIG. 10 is a view showing the relationship between the counter value and the encoded value of the signal processing of the fourth embodiment.

In the fourth embodiment, since the second AD conversion starts with the initial potential being shifted by the amount corresponding to LSB/2, the second counter value of each bit is shifted from the first counter value by LSB/2. The counter values of the first AD conversion and the corresponding counter values of the second AD conversion are added to obtain the encoded values of the fourth embodiment.

The signal processing of the fourth embodiment produces the same advantages as the signal processing of the first embodiment.

In the signal processing of the fourth embodiment, the AD conversion has the same resolution as the conventional AD conversion, as clearly indicated in FIG. 10. Accordingly, a change in noise component over time can be reduced without lowering the resolution. If three (n) AD conversions are performed in the unit time, the second (n-1-th) AD conversion is performed with the initial potential being shifted by an amount corresponding to ⅓ (1/n) LSB from the first (n-2-th) AD conversion, and the third (n-th) AD conversion is performed with the initial potential shifted by an amount corresponding to ⅓ (1/n) LSB from the second (n-1-th) AD conversion.

Next, signal processing of a fifth embodiment will be described.

The signal processing of the fifth embodiment will be described next, with differences from the signal processing of the first embodiment being stressed, and a description of common items is omitted.

Figure 11:
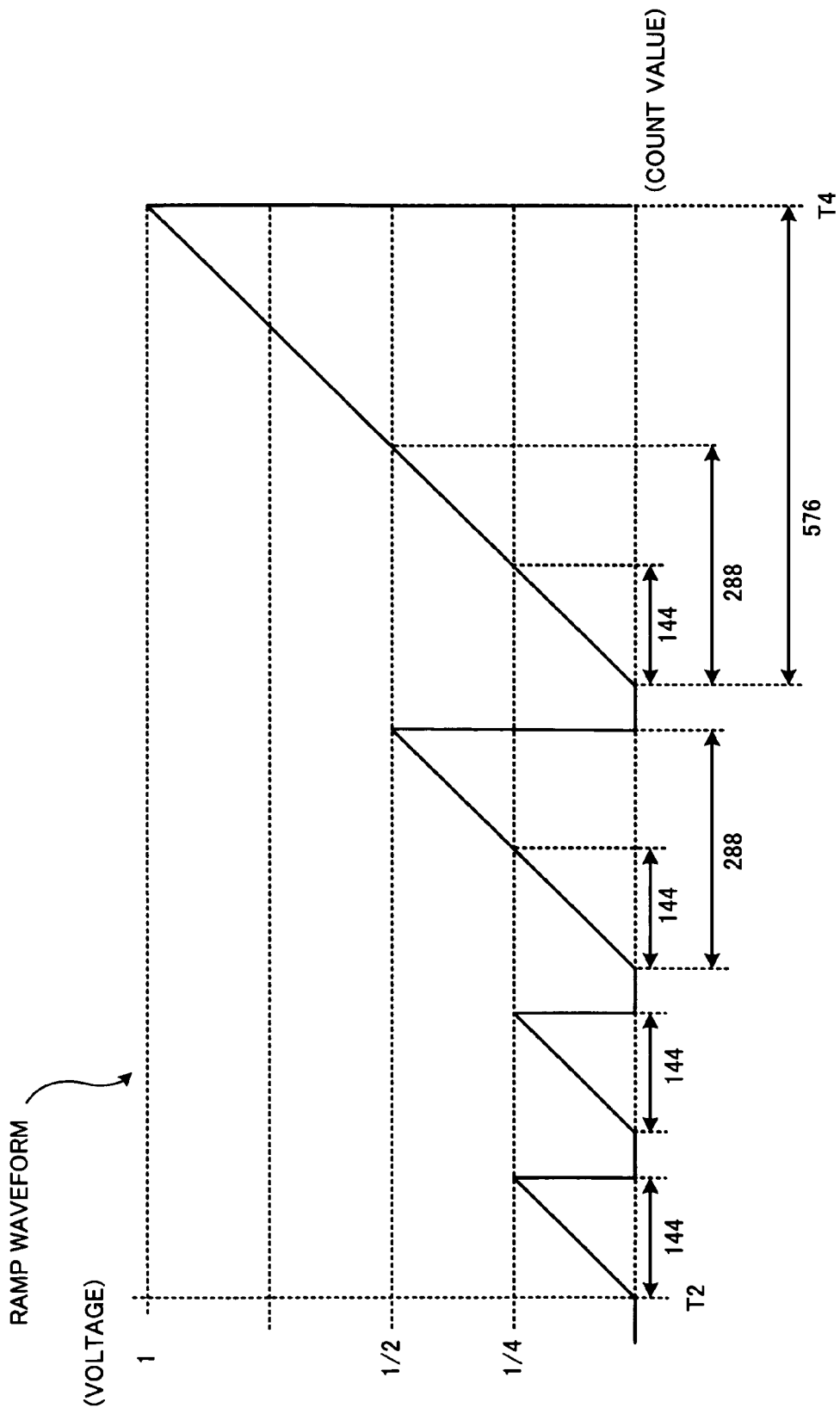
FIG. 11 is a view showing ramp signals of signal processing of a fifth embodiment.

FIG. 11 is a view showing ramp signals used in the signal processing of the fifth embodiment.

In the signal processing of the fifth embodiment, four AD conversions are carried out in the T2-to-T4 time segment. Different potential ranges are used in the AD conversions. To be more specific, one-fourth a ramp signal having the maximum applied voltage, in voltage, is applied in the first and second AD conversions; half the ramp signal in voltage is applied in the third AD conversion; and the ramp signal is applied in the fourth embodiment. It is assumed here that brightness (luminance) is determined in 1152 levels, the minimum level being zero and the maximum level being 1152. When one-fourth the ramp signal, having the maximum applied voltage, is applied, count values in brightness levels 0 to 288 can be obtained. When half the ramp signal is applied, count values in brightness levels 0 to 288 and 288 to 576 can be obtained. If the ramp signal is applied, count values of brightness levels 0 to 288, 288 to 576, and 576 to 1152 can be obtained.

During the AD conversion, brightness levels 0 to 288 are counted fourth (0 to 144, 144 to 288, 288 to 432, 576 to 720) at a resolution of 144 and are added, so that an encoded value of 0 to 576 (144×4) is assigned.

Brightness levels 288 to 576 are counted twice (288 to 576, 576 to 864) at a resolution of 144 and are added, so that an encoded value of 576 to 864 (576+144×2) is assigned.

Brightness levels 576 to 1152 are counted once (576 to 1152) at a resolution of 144, so that an encoded value of 864 to 1152 (864+288×1) is assigned.

Figure 12:
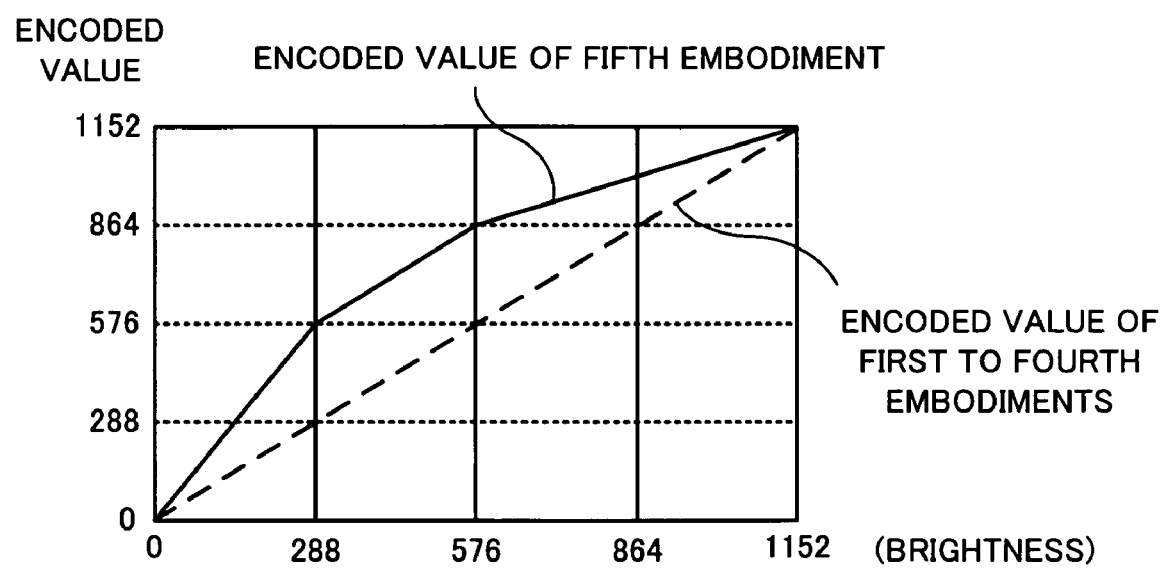
FIG. 12 is a view showing the relationship between the brightness (luminance) and the encoded value of the signal processing of the fifth embodiment.

FIG. 12 is a view (table) showing the relationship between the brightness (luminance) and the encoded value of the signal processing of the fifth embodiment.

A dashed line in FIG. 12 represents the encoded value (output value) of the AD conversion circuit 3b of the first to third embodiments. A solid line represents the encoded value of the AD conversion circuit 3b of the fifth embodiment. In the signal processing of the fifth embodiment, the lower the brightness (luminance) value is, the higher the substantial resolution is; the higher the brightness (luminance) value is, the lower the substantial resolution is. Accordingly, processing similar to gamma conversion can be performed simultaneously when the AD conversion of the read pixel data is performed. This eliminates the need for providing a separate gamma conversion circuit in the imaging circuit of the fifth embodiment, and the imaging circuit can be simplified and downsized. The number of times of AD conversion increases as the brightness value decreases, that is, as the S-N ratio decreases, so that noise can be suppressed in a dark area, where human visual perception is generally high.

An imaging circuit of a sixth embodiment will be described next.

The imaging circuit of the sixth embodiment will be described next, with differences from the imaging circuit 10 of the first embodiment being stressed, and a description of common items is omitted.

The imaging circuit of the sixth embodiment differs from the imaging circuit 10 of the first embodiment in the structure of the pixel portion.

Figure 13:
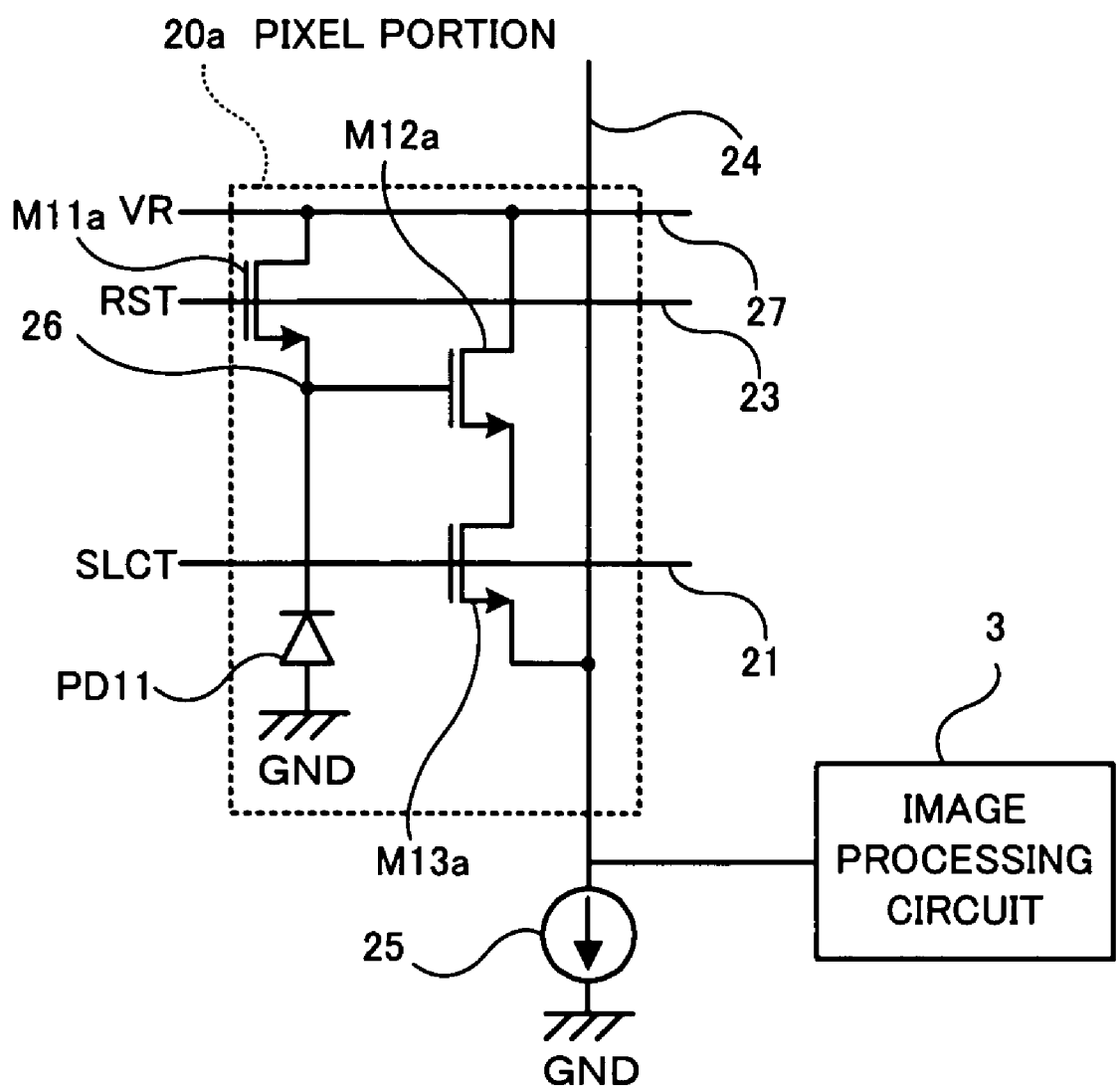
FIG. 13 is a schematic diagram showing a pixel portion of an imaging circuit of a sixth embodiment.

FIG. 13 is a schematic diagram showing the pixel portion of the imaging circuit of the sixth embodiment.

The imaging circuit of the sixth embodiment includes a so-called tri-transistor pixel portion 20a.

Components having the same functions as those in the pixel portion 20 are denoted by the same reference symbols.

The pixel portion 20a includes a photodiode PD11, a reset transistor M11a for resetting the cathode of the photodiode PD11 to an initial voltage, an amplifying transistor M12a for converting a charge accumulated in the photodiode PD11 to a voltage, and a selection transistor M13a for outputting the output voltage of the amplifying transistor M12a as the image signal of a single pixel in accordance with a row selection signal for selecting the signal outputs from pixel portions arranged in rows.

In this type of CMOS image sensor, when the reset transistor M11a is turned on, the potential of the cathode of the photodiode PD11a is specified as the initial voltage, and the charge accumulated in the photodiode PD11a is reset.

Figure 14:
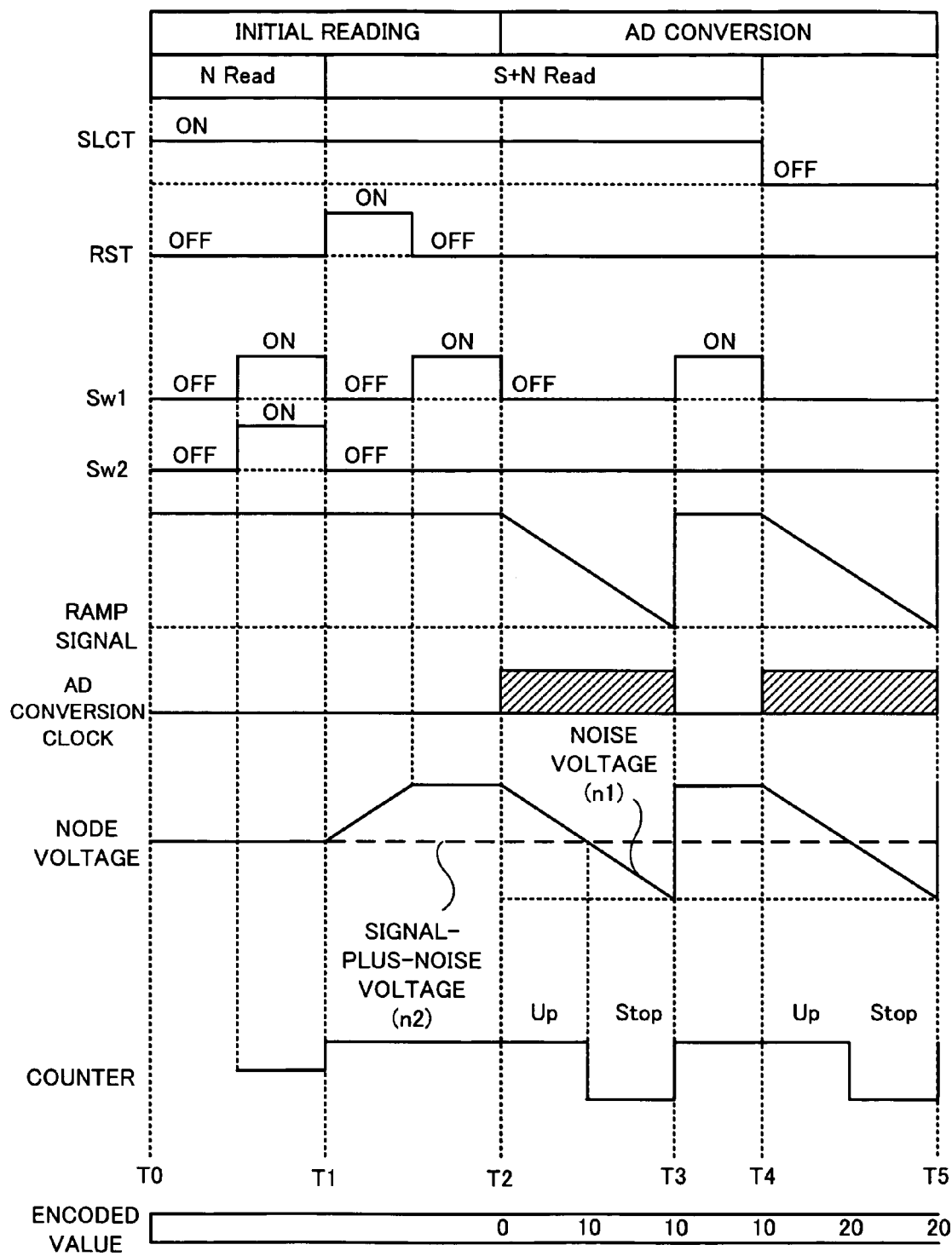
FIG. 14 is a timing chart showing signal processing in the imaging circuit of the sixth embodiment.

FIG. 14 is a timing chart showing signal processing in the imaging circuit of the sixth embodiment.

In the signal processing of the imaging circuit of the sixth embodiment, AD conversion is performed with the signal-plus-noise voltage held in the capacitor C32 and the noise voltage held in the capacitor C31.

The imaging circuit of the sixth embodiment produces the same advantages as the imaging circuit of the first embodiment. Since the imaging circuit of the sixth embodiment includes the tri-transistor pixel portion 20a, a reduced circuit footprint can be used. Because a large sub-pixel portion can be taken, the aperture ratio and transmittance can be improved.

An electronic device using the imaging circuit 10 of the first embodiment will next be described.

Figure 15:
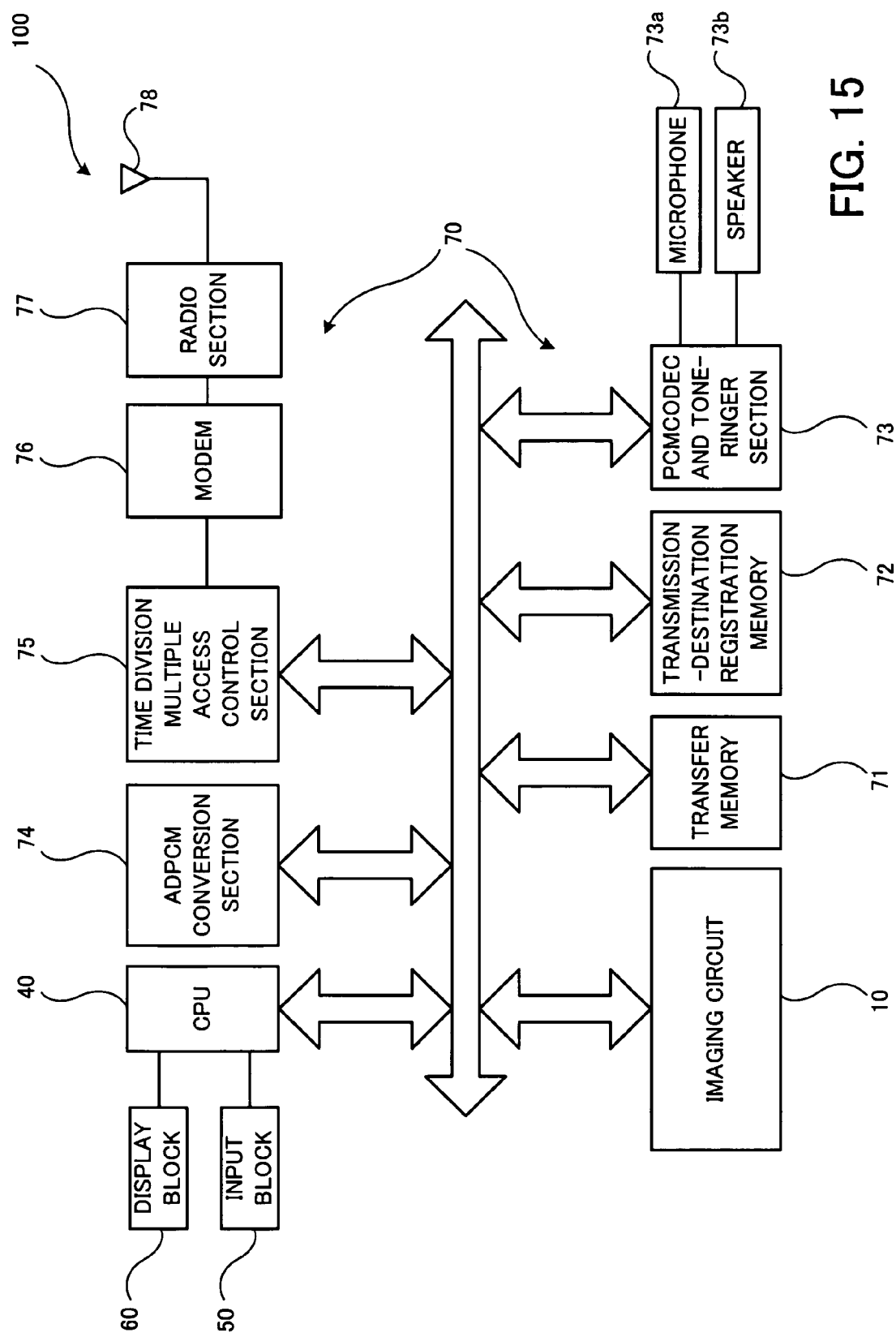
FIG. 15 is a block diagram showing functions of an electronic device according to an embodiment.
Figure 16:
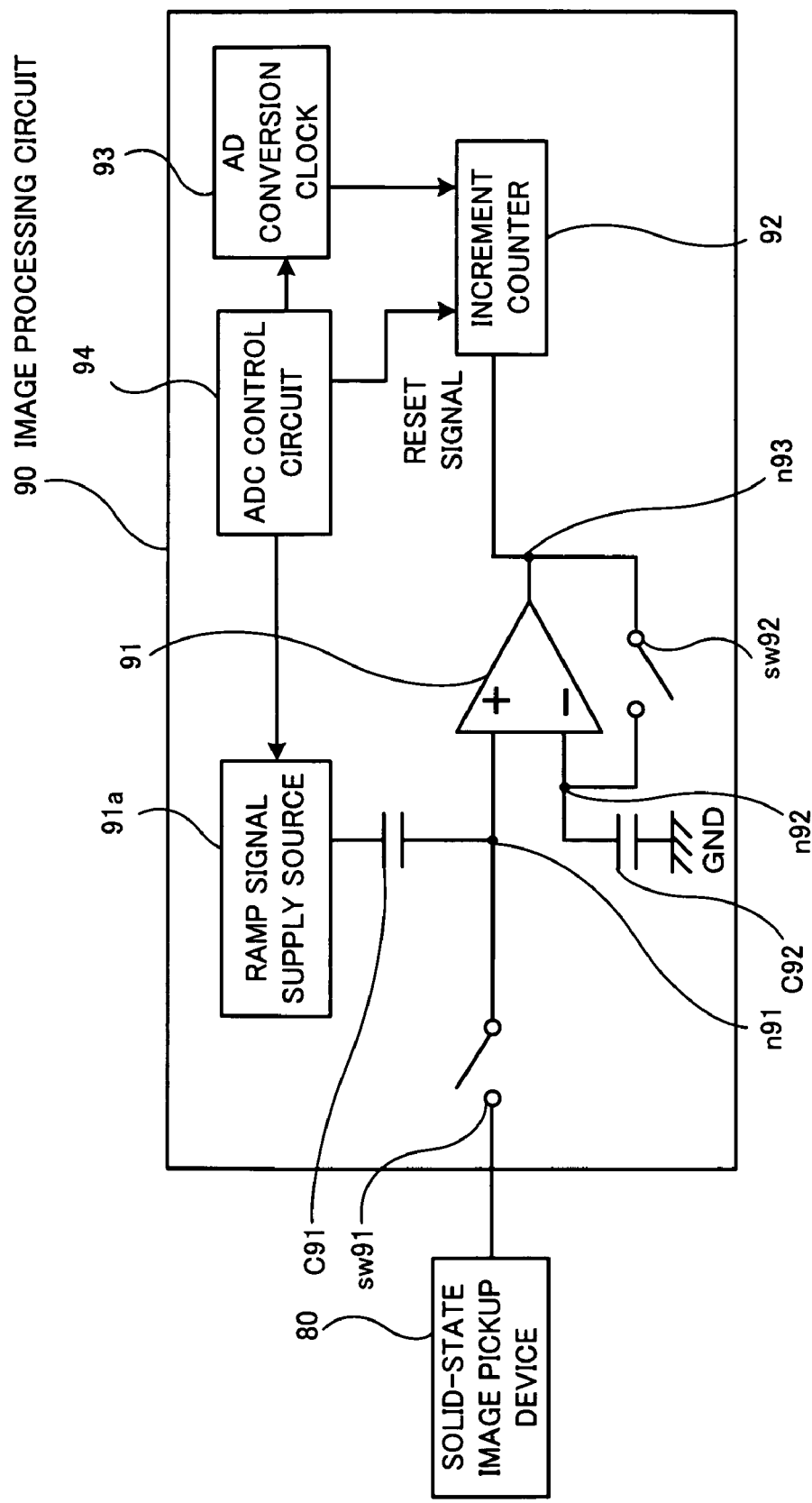
FIG. 16 is a view showing a part of an imaging circuit using a solid-state image pickup device.
Figure 17:
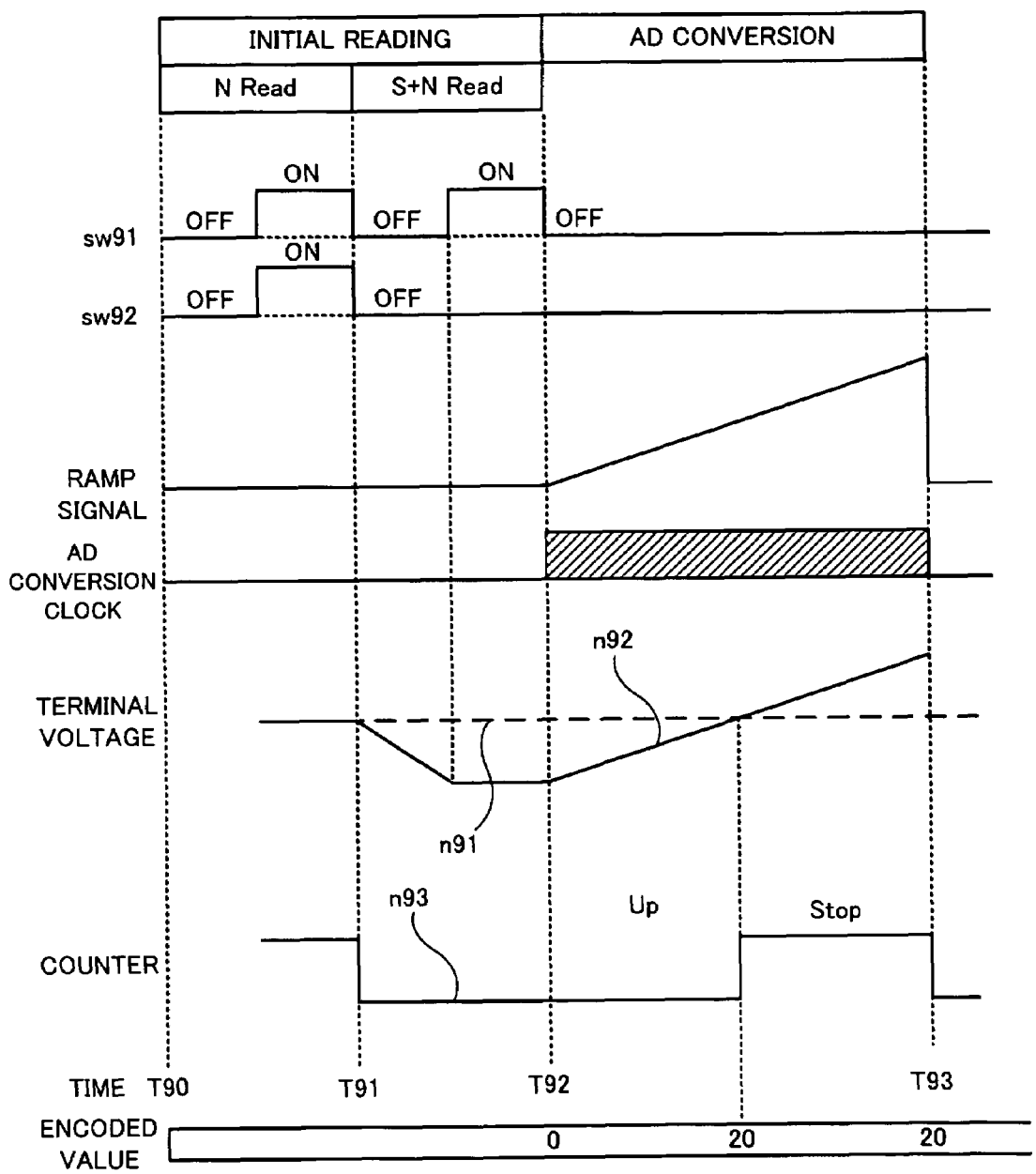
FIG. 17 is a timing chart showing a conventional operation of the imaging circuit.

FIG. 15 is a block diagram showing the functions of the electronic device of the present embodiment.

FIG. 15 shows a portable terminal 100, as an example of the electronic device.

The portable terminal 100 includes a CPU 40, an input block 50, a display block 60, an imaging circuit 10, and a communication block 70.

The imaging circuit 10 and the communication block 70 are connected through a bus.

The CPU 40 controls the operations of the imaging circuit 10 and the communication block 70.

The input block 50 includes keys such as numeric keys and function keys and accepts the input of a telephone number, a command, and the like.

The display block 60 displays various pieces of information output by the CPU 40.

The communication block 70 includes a transfer memory 71, a transmission-destination registration memory 72, a PCMCODEC and tone-ringer section 73, a microphone 73a, a speaker 73b, an ADPCM conversion section 74, a time division multiple access control section 75, a modem 76, a radio section 77, and an antenna 78.

The transfer memory 71 forms a temporary storage unit for holding image information transmitted from the imaging circuit 10 temporarily.

The transmission-destination registration memory 72 forms a storage unit for storing information of a transmission destination.

The PCMCODEC and tone-ringer section 73 outputs a tone ringer signal and a PCMCODEC signal for performing mutual conversion between an analog signal and a digital signal.

The microphone 73a and the speaker 73b are connected to the PCMCODEC and tone-ringer section 73.

The ADPCM conversion section 74 compresses and decompresses sound. The ADPCM conversion section 74 compresses a sound signal to be transmitted and decompresses a received sound signal.

The time division multiple access control section 75 assembles a time division multiple frame from audio data, control data, image data, and the like, or disassembles the frame. The time division multiple access control section 75 exchanges an identification (ID) number with a radio base station continuously or intermittently. The time division multiple access control section 75 also detects the current position from communication information of the communication block 70.

The modem 76 modulates and demodulates a transfer signal.

The radio section 77 is connected to the modem 76 and performs radio communication of information.

The antenna 78 is an antenna for radio transmission.

In the portable terminal 100, the CPU 40 selects a transmission destination from a transmission-destination list stored in the transmission-destination registration memory 72 in accordance with information from the time division multiple access control section 75. The modem 76 and the radio section 77 send image information from the transfer memory 71 in accordance with information sent from the CPU 40.

An image processing circuit, imaging circuits, and an electronic device according to the present invention have been described according to the embodiments shown in the figures. The present invention is not limited to them, and each component can be replaced with a component having the same function. Another component or process may be added to the present invention.

Among the embodiments described above, two or more embodiments (features) of the present invention may be combined. For instance, the signal processing of the fourth embodiment may be applied to the signal processing of the second and third embodiments.

The imaging circuit according to the present invention can be applied to various types of electronic devices, in addition to the portable terminal shown in FIG. 15.

According to the present invention, a plurality of digital code values obtained through several repeated AD conversions is averaged, so that noise of the pixel signal can be reduced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An image processing circuit used in an imaging circuit for capturing an image by using a solid-state image pickup device for reading a pixel signal, the image processing circuit comprising:
   a correlated double sampling (CDS) circuit for taking a potential difference between the pixel signal at a reset of the solid-state image pickup device and the pixel signal after exposure; and
   an analog-to-digital (AD) conversion circuit comprising a circuit for performing AD conversion on the potential difference and processing means for averaging a plurality of digital code values obtained through the AD conversion repeated a plurality of times.

2. The image processing circuit according to claim 1, wherein:
   the CDS circuit comprises a capacitive element for holing the potential difference; and
   the AD conversion circuit repeats the AD conversion with the potential difference held in the capacitive element.

3. The image processing circuit according to claim 1, wherein the CDS circuit comprises a plurality of capacitive elements for holding the potential of the pixel signal at the reset and the potential of the pixel signal after exposure separately; and the AD conversion circuit repeats the AD conversion with the potential of the pixel signal at the reset and the potential of the pixel signal after exposure held separately in the capacitive elements.

4. The image processing circuit according to claim 1, wherein, if the CDS circuit repeats the AD conversion in a predetermined unit time, the processing means adds count values obtained from the AD conversion.

5. The image processing circuit according to claim 4, wherein the AD conversion circuit changes a target potential of AD conversion of the potential difference each time the AD conversion is performed.

6. The image processing circuit according to claim 5, wherein the AD conversion circuit has more target potential ranges having a greater width of AD conversion of the potential difference, than target potential ranges having a small width.

7. The image processing circuit according to claim 4, wherein the AD conversion circuit specifies, as a new offset potential, a potential obtained by shifting an offset potential of a target potential of AD conversion by a value obtained by dividing the potential difference per bit of resolution by the number of AD conversions per unit time.

8. The image processing circuit according to claim 1, wherein, if the CDS circuit repeats the AD conversion performed once in a predetermined unit time, the processing means averages count values obtained from the individual AD conversions.

9. An imaging circuit for capturing an image, comprising:
a solid-state image pickup device for converting incident light to an electric signal; and
an image processing circuit comprising:
a correlated double sampling (CDS) circuit for taking a potential difference between a pixel signal at a reset of the solid-state image pickup device and the pixel signal after exposure; and
an analog-to-digital (AD) conversion circuit comprising:
a circuit for performing AD conversion on the potential difference; and
processing means for averaging a plurality of digital code values obtained through the AD conversion repeated a plurality of times.

10. An electronic device having a function to capture an image, the electronic device comprising:
an imaging circuit comprising:
a solid-state image pickup device for converting incident light to an electric signal; and
an image processing circuit comprising:
a correlated double sampling (CDS) circuit for taking a potential difference between a pixel signal at a reset of the solid-state image pickup device and the pixel signal after exposure; and
an analog-to-digital (AD) conversion circuit comprising:
a circuit for performing AD conversion on the potential difference; and
processing means for averaging a plurality of digital code values obtained through the AD conversion repeated a plurality of times.

* * * * *

UNITED STATES PATENT AND TRADEMARK OFFICE
CERTIFICATE OF CORRECTION

PATENT NO. : 7,345,613 B2
APPLICATION NO. : 11/546287
DATED : March 18, 2008
INVENTOR(S) : Tsuyoshi Higuchi Page 1 of 1

It is certified that error appears in the above-identified patent and that said Letters Patent is hereby corrected as shown below:

IN THE SPECIFICATION:

Please amend the specification as follows:

Column 10, line 33, delete "third" and substitute therefor -- fourth --.

Signed and Sealed this

Nineteenth Day of August, 2008

JON W. DUDAS
*Director of the United States Patent and Trademark Office*